United States Patent
Zhang (10) Patent No.: US 11,305,771 B2
(45) Date of Patent: Apr. 19, 2022

(54) METHOD AND APPARATUS FOR CONTROLLING CRUISE OF VEHICLE, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventor: Lianchuan Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/337,857

(22) Filed: Jun. 3, 2021

(65) Prior Publication Data

US 2021/0291833 A1 Sep. 23, 2021

(30) Foreign Application Priority Data

Jun. 29, 2020 (CN) .......................... 202010605456.6

(51) Int. Cl.
*B60W 30/18* (2012.01)
*B60W 30/06* (2006.01)
(Continued)

(52) U.S. Cl.
CPC ...... *B60W 30/18072* (2013.01); *B60W 30/06* (2013.01); *G05D 1/0223* (2013.01);
(Continued)

(58) Field of Classification Search
CPC .......... B60W 30/18072; B60W 30/06; B60W 2530/201; B60W 2555/20;
(Continued)

(56) References Cited

U.S. PATENT DOCUMENTS

2015/0155009 A1* 6/2015 Mate .................. H04N 21/8456
386/278
2015/0336607 A1* 11/2015 Inoue .................... B60W 30/10
701/41
(Continued)

FOREIGN PATENT DOCUMENTS

CN 104833368 A 8/2015
CN 105556243 A 5/2016
(Continued)

OTHER PUBLICATIONS

Office Action for Chinese Application No. 202010605456.6, dated May 8, 2021, 19 pages.

*Primary Examiner* — Peter D Nolan
*Assistant Examiner* — Demetra R Smith-Stewart
(74) *Attorney, Agent, or Firm* — Fay Sharpe LLP (57) ABSTRACT

The present application discloses a method for controlling cruise of a vehicle. The method includes: acquiring a pre-established three-dimensional trajectory map of the vehicle from a starting point to a destination; acquiring current positioning information of the vehicle; intercepting a target trajectory at a preset distance currently ahead of the vehicle from the three-dimensional trajectory map according to the current positioning information; acquiring a target point from the target trajectory according to the current positioning information; acquiring a wheelbase and a current speed of the vehicle, and calculating an angle that front wheels of the vehicle are required to rotate, according to the target point, the current positioning information, the wheelbase, and the current speed; controlling a movement of the vehicle according to the angle.

11 Claims, 5 Drawing Sheets

(51) Int. Cl.
  *G06T 17/05* (2011.01)
  *G06T 7/73* (2017.01)
  *G05D 1/02* (2020.01)
(52) U.S. Cl.
  CPC .............. *G05D 1/0246* (2013.01); *G06T 7/74* (2017.01); *G06T 17/05* (2013.01); *B60W 2420/42* (2013.01); *B60W 2520/10* (2013.01); *B60W 2530/201* (2020.02); *B60W 2552/30* (2020.02); *B60W 2555/20* (2020.02); *G06T 2207/30252* (2013.01)
(58) Field of Classification Search
  CPC ......... B60W 2552/30; B60W 2420/42; B60W 2520/10; G06T 7/74; G06T 17/05; G06T 2207/30252; G05D 1/0223; G05D 1/0246
  See application file for complete search history.

(56) References Cited

U.S. PATENT DOCUMENTS

| | | | |
|---|---|---|---|
| 2017/0324943 A1* | 11/2017 | Wu | H04N 5/23238 |
| 2019/0204838 A1 | 7/2019 | Haque et al. | |
| 2019/0272389 A1* | 9/2019 | Viente | G01C 21/3602 |
| 2020/0307623 A1* | 10/2020 | Akamatsu | B60W 60/0027 |
| 2020/0377100 A1* | 12/2020 | Sano | B60W 30/10 |
| 2021/0179092 A1* | 6/2021 | Chen | B60W 10/04 |

FOREIGN PATENT DOCUMENTS

| | | |
|---|---|---|
| CN | 110361013 A | 10/2019 |
| CN | 110774319 A | 2/2020 |
| CN | 111307165 A | 6/2020 |
| KR | 20090025822 A | 3/2009 |

* cited by examiner

| Acquiring respectively, in the process of a demonstration phase, in which a user drives the vehicle to travel from the starting point to the destination, images of road ahead of the vehicle in the demonstration phase based on multiple shooting angles of the camera on the vehicle | 301 |

| Constructing the three-dimensional trajectory map for the vehicle from the starting point to the destination according to the acquired images | 302 |

METHOD AND APPARATUS FOR CONTROLLING CRUISE OF VEHICLE, ELECTRONIC DEVICE, AND STORAGE MEDIUM

CROSS-REFERENCE TO RELATED APPLICATION

The present application is based upon and claims priority to Chinese Patent Application No. 202010605456.6, filed on Jun. 29, 2020, the entirety contents of which are incorporated herein by reference.

TECHNICAL FIELD

The present application relates to the field of vehicle control, specifically to the field of automatic driving and the field of artificial intelligence technology, and in particular to a method and an apparatus for controlling cruise of a vehicle, an electronic device, and a storage medium.

BACKGROUND

Automatic parking system (Homezone Auto Valet Parking, H-AVP) can assist users in automatic parking. In the process of using the H-AVP system to assist users in completing automatic parking, it is required to use forward cruise technology to control the vehicle to automatically drive to parking location. Therefore, how to realize the forward cruise in the H-AVP scene has become a problem to be solved.

SUMMARY

Embodiments of the present disclosure provide a method for controlling cruise of a vehicle. The method includes: acquiring a pre-established three-dimensional trajectory map of the vehicle from a starting point to a destination; acquiring current positioning information of the vehicle; intercepting a target trajectory at a preset distance currently ahead of the vehicle from the three-dimensional trajectory map according to the current positioning information; acquiring a target point from the target trajectory according to the current positioning information; acquiring a wheelbase and a current speed of the vehicle, and calculating an angle that front wheels of the vehicle are required to rotate, according to the target point, the current positioning information, the wheelbase, and the current speed; controlling a movement of the vehicle according to the angle.

Embodiments of the present disclosure provide an apparatus for controlling cruise of a vehicle. The apparatus includes: one or more processors; a memory storing instructions executable by the one or more processors; in which the one or more processors are configured to: acquire a pre-established three-dimensional trajectory map of the vehicle from a starting point to a destination; acquire current positioning information of the vehicle; intercept a target trajectory at a preset distance currently ahead of the vehicle from the three-dimensional trajectory map according to the current positioning information; acquire a target point from the target trajectory according to the current positioning information; acquire a wheelbase and a current speed of the vehicle; calculate an angle that front wheels of the vehicle are required to rotate, according to the target point, the current positioning information, the wheelbase, and the current speed, and to control a movement of the vehicle according to the angle.

Embodiments of the present disclosure provide a non-transitory computer-readable storage medium having instructions stored thereon, in which the instructions are implemented to execute a method for controlling cruise of a vehicle, and the method includes: acquiring a pre-established three-dimensional trajectory map of the vehicle from a starting point to a destination; acquiring current positioning information of the vehicle; intercepting a target trajectory at a preset distance currently ahead of the vehicle from the three-dimensional trajectory map according to the current positioning information; acquiring a target point from the target trajectory according to the current positioning information; acquiring a wheelbase and a current speed of the vehicle, and calculating an angle that front wheels of the vehicle are required to rotate, according to the target point, the current positioning information, the wheelbase, and the current speed; controlling a movement of the vehicle according to the angle.

It is to be appreciated that the content described in this section is not intended to identify the key or important features of the embodiments of the present application, nor is it intended to limit the scope of the present application. Other features of the present application will be easily appreciated through the following description.

BRIEF DESCRIPTION OF THE DRAWINGS

The drawings will be used to better understand the present solution, and do not constitute a limitation to the present application. In the drawings.

DETAILED DESCRIPTION

Exemplary embodiments of the present application will be explained below in connection with the accompanying drawings, which include various details of embodiments of the present application to facilitate understanding, and should be regarded as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures will be omitted in the following description.

Figure 1:
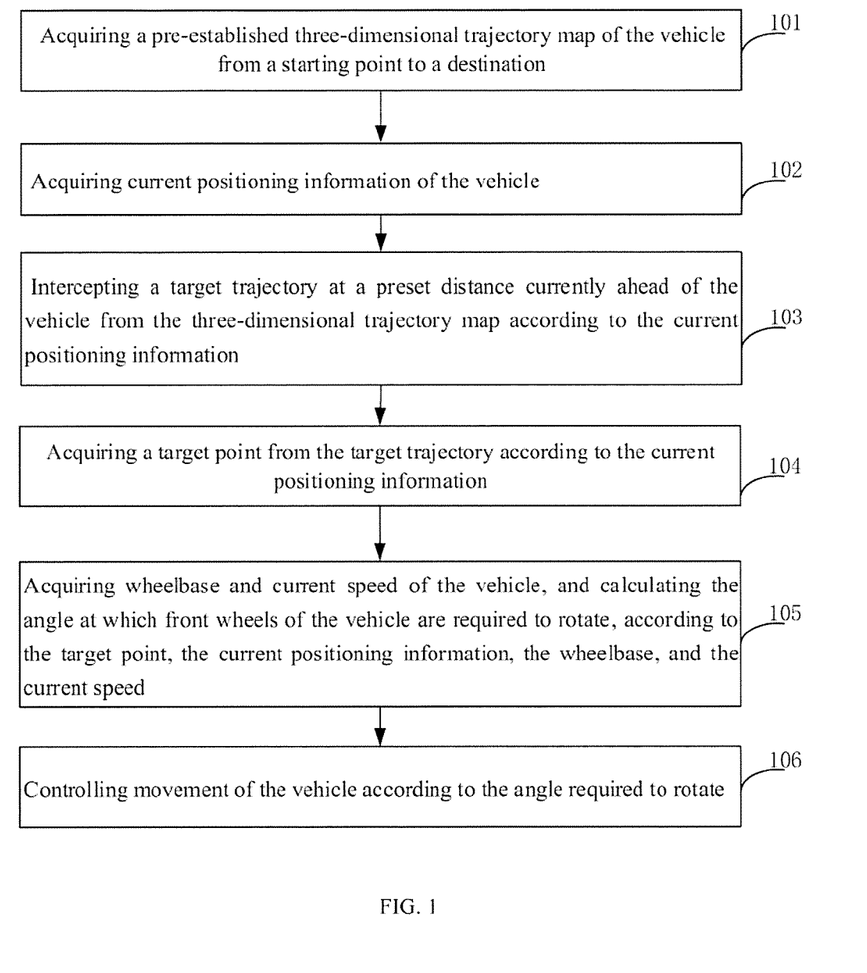
FIG. 1 is a flow chart of a method for controlling cruise of a vehicle according to one embodiment of the present application.

FIG. 1 is a flow chart of a method for controlling cruise of a vehicle according to one embodiment of the present application. Wherein it should be noted that, the execution subject of the method for controlling cruise of the vehicle of embodiments of the application is the device for controlling cruise of the vehicle of embodiments of the application. The device may be implemented in a way of software and or hardware, or may be configured in an electronic device, which may include, but not limited to, terminals, server terminals, etc.

The embodiments of the present application relate to vehicle control instructions, especially to the field of automatic driving and the field of artificial intelligence technology, wherein the field of automatic driving technology is mainly to study methods for automatic driving, methods for automatic parking, algorithm models for assisting automatic driving, and hardware system architecture designs that supports automatic driving, etc. The methods for automatic parking in the field of automatic driving technology means that a car automatically drives into the parking space without manual control. The English abbreviation of Artificial Intelligence is AI. It is a new technological science that studies and develops theories, methods, technologies and application systems used to simulate, extend and expand human intelligence.

It should be noted that the automatic parking system can assist users in automatic parking. In the process of using the automatic parking system to assist users in completing automatic parking, it is required to use forward cruise technology to control the vehicle to drive from the starting point to the destination automatically. An embodiment of the present application provides a method of how to realize forward cruise of the vehicle to enable the vehicle from the starting point to the destination. As shown in FIG. 1, the method for controlling cruise of the vehicle may include:

A step 101 of acquiring a pre-established three-dimensional trajectory map of the vehicle from a starting point to a destination.

It should be noted that the method for controlling cruise of the vehicle of the embodiment of the present application can be applied to the automatic parking system. The automatic parking system mainly includes two parts, namely, car recruiting and car returning, wherein car recruiting refers to the vehicle driving from the parking space to the destination selected by the user; car returning refers to the vehicle driving from the starting point selected by the user to the vicinity of the parking space. It is to be appreciated that, whether it is in the process of car recruiting or car returning, it is necessary to use the forward cruise to control the vehicle to drive forward, wherein if the forward cruise is used to control the vehicle to drive forward in the process of car recruiting, the above-mentioned starting point can be appreciated as a certain location near the parking space, and the above-mentioned destination can be appreciated as the destination selected by the user. And if the forward cruise is used to control the vehicle to drive forward in the process of car returning, the above-mentioned starting point can be appreciated as the location where the user currently locates, and the above-mentioned destination can be appreciated as a certain location near the parking space.

In an embodiment of the present application, in order to be able to realize the automatic cruise of the vehicle from the starting point to drive to the destination, a three-dimensional trajectory map of the vehicle from the starting point to the destination needs to be established first, so that the vehicle is enabled to realize the automatic cruise from the starting point to drive to the destination based on the pre-established three-dimensional trajectory map and positioning technology. As a possible implementation, the three-dimensional trajectory map may be constructed according to such images: the images are images of road ahead of the vehicle in a demonstration phase, that are respectively acquired based on multiple shooting angles of the camera on the vehicle, in the process of the demonstration phase, in which a user drives the vehicle to travel from the starting point to the destination. Wherein the method of establishing the three-dimensional trajectory map of the vehicle from the starting point to the destination can be referred to the description of the subsequent embodiments.

A step 102 of acquiring current positioning information of the vehicle.

In some embodiments of the present application, the current positioning information of the vehicle can be acquired through a positioning device on the vehicle, such as GPS (Global Positioning System), etc. In other embodiments of the present application, images of road ahead of the vehicle can be acquired through a front wide-angle camera on the vehicle, and three-dimensional image of the road currently ahead can be reconstructed based on the acquired images, and positioning can be performed based on the three-dimensional image and the pre-established three-dimensional trajectory map, to acquire the current positioning information of the vehicle. It is to be appreciated that other technical means may also be used to acquire the current positioning information of the vehicle, which is not specifically limited in the present application.

A step 103 of intercepting a target trajectory at a preset distance currently ahead of the vehicle from the three-dimensional trajectory map according to the current positioning information.

It is to be appreciated that the three-dimensional trajectory map is a completed driving trajectory for the vehicle driving from the starting point to the destination, but when controlling e cruise of the vehicle, only the current three-dimensional trajectory is needed to realize the current cruise control of the vehicle. Therefore, in an embodiment of the present application, when the current positioning information of the vehicle is obtained, a target trajectory at a certain distance ahead of the vehicle can be intercepted from the three-dimensional trajectory map according to the current positioning information. Therefore, by using the three-dimensional trajectory at a certain distance ahead of the vehicle to realize real-time controlling of forward cruise of the vehicle, the amount of calculation can be reduced.

A step 104 of acquiring a target point from the target trajectory according to the current positioning information.

In an embodiment of the present application, the point closest to the vehicle can be found on the target trajectory according to the current positioning information first, and then the target point can be found based on the point closest to the vehicle. Specifically, within the range of the forward-looking distance, there may be multiple points on the target trajectory, and the one point closest to the forward-looking distance from the starting point should be selected. In order to find this point that best meets the requirement, a point on the target trajectory, which is closest to this moment, can be selected first, so that the point closest to the vehicle can be found on the target trajectory, and by using the found point closest to the vehicle, the point in the target trajectory can be acquired, that is closest to the forward-looking distance from this point, and this point is determined as the target point.

A step 105 of acquiring wheelbase and current speed of the vehicle, and calculating the angle at which front wheels of the vehicle are required to rotate, according to the target point, the current positioning information, the wheelbase, and the current speed.

In an embodiment of the present application, after the target point is obtained, the angle at which the front wheels of the vehicle are required to rotate can be calculated based on the Pure Persuit (pure tracking) algorithm according to the target point, the current positioning information, the wheelbase, and the current speed.

Figure 2:
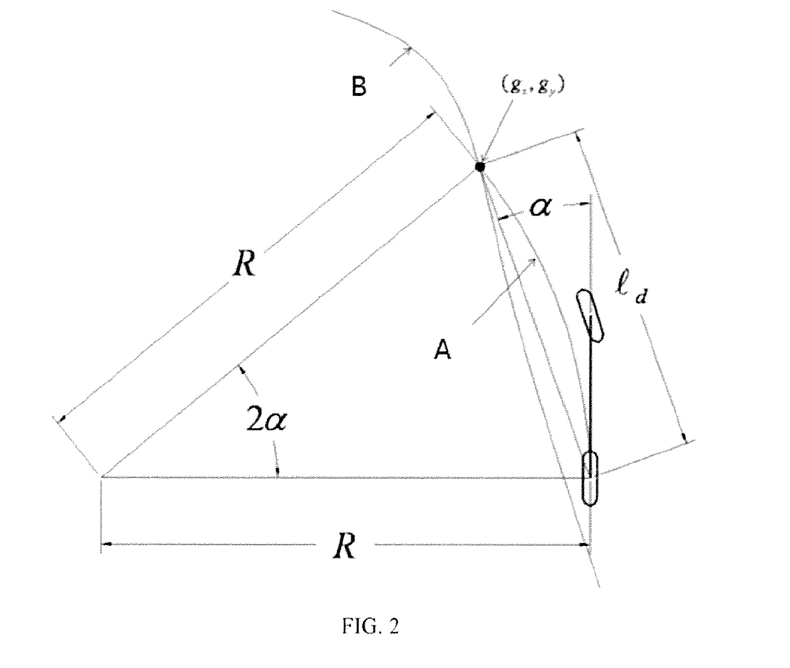
FIG. 2 is an example diagram of calculating angle of front wheels of a vehicle that is required to rotate according to an embodiment of the present application.

It should be noted that, based on the pure tracking algorithm, by taking the rear axle of the vehicle as the tangent point and the longitudinal vehicle body of the vehicle as the tangent line, and by controlling the rotation angle of the front wheels, the vehicle is enable to drive along an arc A passing through the target point. For example, as shown in FIG. 2, $(g_x, g_y)$ in the figure is the next target point to be tracked, which is located on the target trajectory B. Now it is necessary to control the rear axle of the vehicle to pass through this target point, and $l_d$ represents the distance from the current position of the vehicle (i.e. the position of the rear axle) to the target point, and a represents the angle between the current posture of the vehicle body and the target point, then the following conversion equation can be derived according to the law of sine:

$$\frac{l_d}{\sin(2\alpha)} = \frac{R}{\sin(\frac{\pi}{2} - \alpha)},$$

$$\frac{l_d}{2\sin\alpha\cos\alpha} = \frac{R}{\cos\alpha},$$

$$\frac{l_d}{\sin\alpha} = 2R,$$

where R is the radius of the circle that the rear axle follows under a given front wheel steering angle.

Since the curvature of the target trajectory $$\kappa = \frac{1}{R},$$

the above equation can also be expressed as:

$$\kappa = \frac{2\sin\alpha}{l_d}.$$

Then from the equation $$\tan\delta = \frac{L}{R},$$

the following can be obtained:

$$\delta = \arctan\left(\frac{L}{R}\right) = \arctan(\kappa L) = \arctan\left(\frac{2L\sin(\alpha)}{l_d}\right),$$

And then by adding the variable time, the following can be obtained:

$$\delta(t) = \tan^{-1}\left(\frac{2L\sin(\alpha(t))}{l_d}\right).$$

It should be noted that, taking time into consideration, in the event that the angle $\alpha(t)$ between the vehicle body and the target point at time t, and the forward-looking distance $l_d$ from the target point are known, since the wheelbase L of the vehicle is fixed, the above equation can be used to estimate the rotation angle δ of the front wheels that should be made. In order for the better understanding of the principle of the pure tracking algorithm, a new quantity can be defined: $e_l$, which represents the error between the current posture of the vehicle and the target point in the lateral direction, and thereby the sine of the included angle can be obtained:

$$\sin(\alpha) = \frac{e_l}{l_d},$$

and then the curvature can be expressed as:

$$\kappa = \frac{2\sin(\alpha)2}{l_d} = \frac{2}{l_d^2}e_l.$$

Considering that it is substantively the error in the lateral direction, it can be known from the above equation that, the pure tracking controller is actually a P-controller with a lateral rotation angle, the P coefficient of which is $$\frac{2}{l_d^2},$$

and this P controller is greatly influenced by the parameter $l_d$ i.e., forward-looking distance). And how to adjust the forward-looking distance becomes the key to the pure tracking algorithm. Generally speaking, $l_d$ is considered as a function of the speed of the vehicle, and different forward-looking distances need to be selected at different speeds of the vehicle.

A common method of adjusting the forward-looking distance is to express the forward-looking distance as a linear function of the longitudinal speed of the vehicle, that is, $l_d = Kv_t$, then the formula for the rotation angle of the front wheels becomes the following equation (1).

$$\delta(t) = \tan^{-1}\left(\frac{2L\sin(\alpha(t))}{Kv_t}\right) \quad (1)$$

And then the adjustment of the pure tracking controller becomes the adjustment of the coefficient K. Generally speaking, the maximum and minimum forward-looking distances will be used to constrain the forward-looking distance. The larger forward-looking distance means the smoother tracking of the trajectory, and a small forward-looking distance will make the tracking more accurate (of course it will also bring about the oscillation of control). Therefore, after obtaining the wheelbase and the current speed of the vehicle, the angle between the current posture of the vehicle body and the target point can be calculated, and according to this angle, the wheelbase and the current speed, by using the above formula (1) for calculating the rotation angle of the front wheels, the angle at which the front wheels of the vehicle are required to rotate can be calculated, wherein the angle required to rotate can be understood as the steering angle required for the vehicle to reach the target point.

A step 106 of controlling movement of the vehicle according to the angle required to rotate.

Optionally, when the angle at which the front wheels of the vehicle are currently required to rotate is estimated, the movement of the vehicle can be controlled according to the angle currently required to rotate, so that the vehicle can reach the target point, and the state of the vehicle can be updated according to the movement of the vehicle per unit of time, so as to make the vehicle drive forward along the target trajectory, so that the automatic driving of the vehicle from the starting point to the destination can be realized.

In the method for controlling cruise of the vehicle according to an embodiment of the present application, a pre-established three-dimensional trajectory map of the vehicle from a starting point to a destination can be acquired, and current positioning information of the vehicle can be acquired, and a target trajectory at a preset distance currently ahead of the vehicle can be intercepted from the three-dimensional trajectory map according to the current positioning information, and thereafter a target point can be acquired from the target trajectory according to the current positioning information, and the angle, at which front wheels of the vehicle are required to rotate, can be calculated according to the target point, the current positioning information, the wheelbase, and the current speed, and then movement of the vehicle can be controlled according to the angle required to rotate, so that the vehicle can automatically travel from the starting point to the destination. Thereby, in the controlling of the forward cruise of the vehicle, since the trajectory map used is a pre-established three-dimensional trajectory map, the method for controlling cruise of the present application is enabled to be applied to any road scene (such as a scene with complex roads or a scene of simple straight-travelling). As long as the three-dimensional trajectory map of the vehicle when driving on the road is pre-established, then in automatic driving, based on the pre-established three-dimensional trajectory map and the positioning information of the vehicle, the controlling of the forward cruise of the vehicle can be realized, so that the vehicle can automatically drive from the starting point to the destination, which can be applied to valet parking application scenarios.

Figure 3:
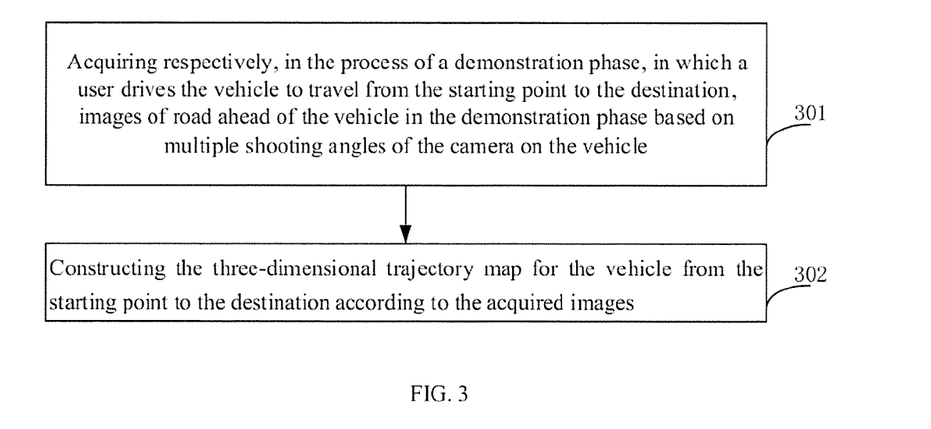
FIG. 3 is a flow chart of a method for controlling cruise of a vehicle according to another embodiment of the present application.

It should be noted that, in order to be able to realize the automatic cruise of the vehicle from the starting point to drive to the destination, a three-dimensional trajectory map of the vehicle from the starting point to the destination needs to be established first, so that the vehicle is enabled to realize the automatic cruise from the starting point to drive to the destination based on the pre-established three-dimensional trajectory map and positioning technology. In some embodiments of the present application, as shown in FIG. 3, on the basis as shown in FIG. 1, before acquiring the pre-established three-dimensional trajectory map of the vehicle from the starting point to the destination, the method for controlling cruise of the vehicle may further include:

A step of 301 of respectively acquiring, in the process of a demonstration phase, in which a user drives the vehicle to travel from the starting point to the destination, images of road ahead of the vehicle in the demonstration phase based on multiple shooting angles of the camera on the vehicle.

For example, the process of driving from the starting point to the destination can be demonstrated by the user driving the vehicle, and in the process of the demonstration phase, in which the user drives the vehicle to travel from the starting point to the destination, images of road ahead of the vehicle in the demonstration phase can be respectively acquired based on the multiple shooting angles of the camera on the vehicle. For example, a wide-angle camera is installed on the front windshield of the vehicle, and in the process of the demonstration phase, in which the user drives the vehicle to travel from the starting point to the destination, images of the road ahead of the vehicle can be simultaneously acquired by using the camera and taking multiple shooting angles. As an example, the number of shooting angles can be 3, that is, three different shooting angles can be used to acquire the images of the road ahead of the vehicle, so as to perform subsequent three-dimensional reconstruction based on the images acquired from different shooting angles to construct the three-dimensional trajectory map of the vehicle from the starting point to the destination.

A step 302 of constructing the three-dimensional trajectory map for the vehicle from the starting point to the destination according to the acquired images.

Optionally, images of the same scene acquired based on the multiple shooting angles will be acquired from the acquired images, and the images of the same scene will be superimposed to acquire a three-dimensional image for the same scene, and afterward splicing processing will be performed on the three-dimensional images of different scenes between the starting point and the destination to generate the three-dimensional trajectory map from the starting point to the destination for the vehicle. That is, by superimposing the images acquired from different shooting angles to achieve three-dimensional reconstruction, the calculation is simple and the amount of calculation is reduced.

Thus, in the process of the demonstration phase, in which the user drives the vehicle to travel from the starting point to the destination, through three-dimensional reconstruction from the acquired images of the road ahead to construct the three-dimensional trajectory map of the vehicle from the starting point to the destination, the three-dimensional trajectory of travelling by the user driving will be reproduced.

Figure 4:
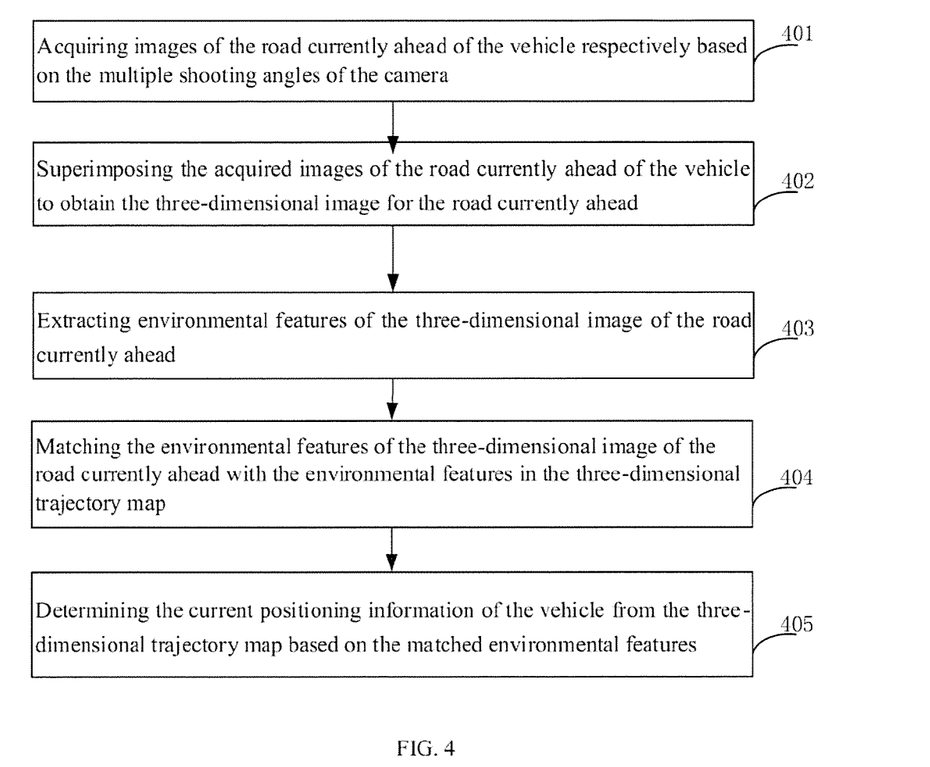
FIG. 4 is a flow chart of a method for controlling cruise of a vehicle according to yet another embodiment of the present application.

In some embodiments of the present application, the current positioning information of the vehicle may be acquired by means of image positioning. Specifically, as shown in FIG. 4, the specific implementation process of acquiring the current positioning information of the vehicle may include:

A step 401 of acquiring images of the road currently ahead of the vehicle respectively based on the multiple shooting angles of the camera.

That is to say, in the automatic driving phase, when the vehicle is controlled to travel forward through the forward cruise technology, the images of the road currently ahead of the vehicle can be acquired respectively through multiple shooting angles of the front-view camera on the vehicle.

A step 402 of superimposing the acquired images of the road currently ahead of the vehicle to obtain the three-dimensional image for the road currently ahead.

A step 403 of extracting environmental features of the three-dimensional image of the road currently ahead.

A step 404 of matching the environmental features of the three-dimensional image of the road currently ahead with the environmental features in the three-dimensional trajectory map.

That is to say, there are environmental features of each scene in the pre-established three-dimensional trajectory map. After obtaining the environmental features of the three-dimensional image of the road currently ahead, the environmental features can be matched with the environmental features in the three-dimensional trajectory map, and the current positioning information of the vehicle can be determined according to the matching result.

A step 405 of determining the current positioning information of the vehicle from the three-dimensional trajectory map based on the matched environmental features.

Therefore, combined with the pre-established three-dimensional trajectory map, by acquiring the current positioning information of the vehicle by way of image positioning, the positioning of the current location of the vehicle can be realized without other high-end equipment such as radar and GPS, which reduces the cost.

In order to be able to improve the accuracy of positioning and ensure the safety of vehicle driving, in some embodiments of the present application, in the positioning process, real-time movement compensation can be realized based on the odometer, thereby increasing the frequency of positioning. Specifically, in the positioning process, if the camera is in a non-acquisition period, mileage that the vehicle has driven in the current non-acquisition period of the camera will be acquired; real-time positioning information of the vehicle will be acquired according to the mileage that the vehicle has driven in the current non-acquisition period of the camera, and the positioning information obtained based on the images of the road ahead of the vehicle acquired in the previous acquisition period.

It should be noted that, due to the realization of the positioning of the vehicle based on the three-dimensional trajectory map of the three-dimensional reconstruction and by way of image positioning, the frequency of positioning is low on the vehicle-mounted platform with low computing power. In order to be able to improve the accuracy of positioning, real-time movement compensation can be realized based on odometer to increase the frequency of positioning. That is to say, in the positioning process, when the camera is in an acquisition period, the current position of the vehicle can be located by way of image positioning. And if the camera is in a non-acquisition period, because the vehicle will continue to move forward during this period of time, mileage that the vehicle has driven in the current non-acquisition period can be acquired at this time, and real-time positioning information of the vehicle can be obtained according to the mileage that the vehicle has driven in the current non-acquisition period of the camera, and the positioning information obtained based on the images of the road ahead of the vehicle acquired in the previous acquisition period. For example, suppose that the positioning information obtained based on the images of the road ahead of the vehicle acquired in the previous acquisition period is that the vehicle has traveled 200 meters, and the mileage that the vehicle has traveled in the current non-acquisition period is 10 meters, then this mileage will be compensated onto the positioning formation obtained last time, to obtain the real-time positioning information of the vehicle as: the vehicle has traveled 210 meters.

Figure 5:
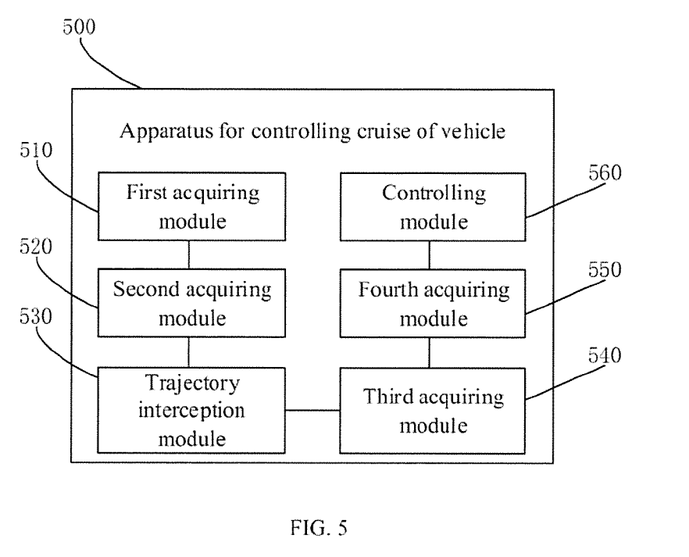
FIG. 5 is a structural block diagram of a device for controlling cruise of a vehicle according to one embodiment of the present application.

FIG. 5 is a structural block diagram of a device for controlling cruise of a vehicle according to one embodiment of the present application. As shown in FIG. 5, the device 500 for controlling cruise of the vehicle may include: a first acquisition module 510, a second acquisition module 520, a trajectory interception module 530, a third acquisition module 540, a fourth acquisition module 550, and a controlling module 560.

Specifically, the first acquisition module 510 is configured for acquiring a pre-established three-dimensional trajectory map of the vehicle from a starting point to a destination. As a possible implementation, the three-dimensional trajectory map may be constructed according to such images: the images are images of road ahead of the vehicle in a demonstration phase, that are respectively acquired based on multiple shooting angles of the camera on the vehicle, in the process of the demonstration phase, in which a user drives the vehicle to travel from the starting point to the destination.

In some embodiments of the present application, the constructing the three-dimensional trajectory map according to such images includes: acquiring, from the images, images of the same scene acquired based on the multiple shooting angles; superimposing the images of the same scene to acquire a three-dimensional image for the same scene; performing splicing processing on the three-dimensional images of different scenes between the starting point and the destination to generate the three-dimensional trajectory map from the starting point to the destination for the vehicle.

The second acquisition module 520 is configured for acquiring current positioning information of the vehicle. In some embodiments of the present application, the second acquisition module 520 is specifically configured for: acquiring images of the road currently ahead of the vehicle respectively based on the multiple shooting angles of the camera; superimposing the acquired images of the road currently ahead of the vehicle to acquire the three-dimensional image for the road currently ahead; extracting environmental features of the three-dimensional image of the road currently ahead; matching the environmental features of the three-dimensional image of the road currently ahead with the environmental features in the three-dimensional trajectory map; determining the current positioning information of the vehicle from the three-dimensional trajectory map based on the matched environmental features.

The trajectory interception module 530 is configured for intercepting a target trajectory at a preset distance currently ahead of the vehicle from the three-dimensional trajectory map according to the current positioning information:

The third acquisition module 540 is configured for acquiring a target point from the target trajectory according to the current positioning information;

The fourth acquisition module 550 is configured for acquiring wheelbase and current speed of the vehicle;

The controlling module 560 is configured for calculating the angle at which front wheels of the vehicle are required to rotate, according to the target point, the current positioning information, the wheelbase, and the current speed, and controlling movement of the vehicle according to the angle required to rotate.

In the device for controlling cruise of the vehicle according to an embodiment of the present application, a pre-established three-dimensional trajectory map of the vehicle from a starting point to a destination can be acquired, and current positioning information of the vehicle can be acquired, and a target trajectory at a preset distance currently ahead of the vehicle can be intercepted from the three-dimensional trajectory map according to the current positioning information, and thereafter a target point can be acquired from the target trajectory according to the current positioning information, and the angle, at which front wheels of the vehicle are required to rotate, can be calculated according to the target point, the current positioning information, the wheelbase, and the current speed, and then movement of the vehicle can be controlled according to the angle required to rotate, so that the vehicle can automatically travel from the starting point to the destination. Thereby, in the controlling of the forward cruise of the vehicle, since the trajectory map used is a pre-established three-dimensional trajectory map, the method for controlling cruise of the present application is enabled to be applied to any road scene (such as a scene with complex roads or a scene of simple straight-travelling). As long as the three-dimensional trajectory map of the vehicle when driving on the road is pre-established, then in automatic driving, based on the pre-established three-dimensional trajectory map and the positioning information of the vehicle, the controlling of the forward cruise of the vehicle can be realized, so that the vehicle can automatically drive from the starting point to the destination, which can be applied to valet parking application scenarios.

Figure 6:
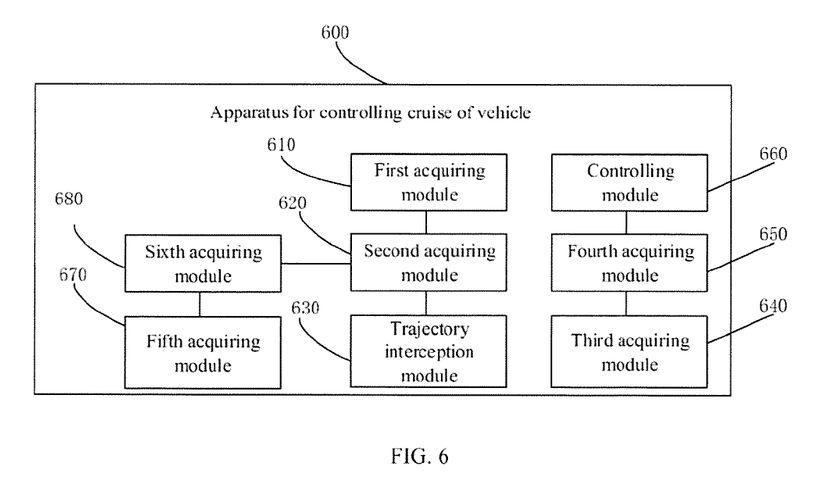
FIG. 6 is a structural block diagram of a device for controlling cruise of a vehicle according to another embodiment of the present application.

FIG. 6 is a structural block diagram of a device for controlling cruise of a vehicle according to another embodiment of the present application. As shown in FIG. 6, the device 600 for controlling cruise of the vehicle includes: a first acquisition module 610, a second acquisition module 620, a trajectory interception module 630, a third acquisition module 640, a fourth acquisition module 650, a controlling module 660, a fifth acquisition module 670, and a sixth acquisition module 680.

Specifically, the first acquisition module 610 is configured for acquiring a pre-established three-dimensional trajectory map of the vehicle from a starting point to a destination.

The second acquisition module 620 is configured for acquiring current positioning information of the vehicle.

The trajectory interception module 630 is configured for intercepting a target trajectory at a preset distance currently ahead of the vehicle from the three-dimensional trajectory map according to the current positioning information.

The third acquisition module 640 is configured for acquiring a target point from the target trajectory according to the current positioning information.

The fourth acquisition module 650 is configured for acquiring wheelbase and current speed of the vehicle.

The controlling module 660 is configured for calculating the angle at which front wheels of the vehicle are required to rotate, according to the target point, the current positioning information, the wheelbase, and the current speed, and controlling movement of the vehicle according to the angle required to rotate.

The fifth acquisition module 670 may be configured for acquiring, in the positioning process, when the camera is in a non-acquisition period, mileage that the vehicle has driven in the current non-acquisition period of the camera.

The sixth acquisition module 680 may be configured for acquiring real-time positioning information of the vehicle according to the mileage that the vehicle has driven in the current non-acquisition period of the camera, and the positioning information obtained based on the images of the road ahead of the vehicle acquired in the previous acquisition period.

In the device for controlling cruise of the vehicle according to an embodiment of the present application, in the positioning process, if the camera is in a non-acquisition period, mileage that the vehicle has driven in the current non-acquisition period of the camera will be acquired; real-time positioning information of the vehicle will be acquired according to the mileage that the vehicle has driven in the current non-acquisition period of the camera, and the positioning information obtained based on the images of the road ahead of the vehicle acquired in the previous acquisition period. That is, in the positioning process, real-time movement compensation can be realized based on the odometer, which can increase the frequency of positioning, so that the accuracy of positioning can be improved and the safety of vehicle driving can be ensured.

According to an embodiment of the present application, the present application also provides an electronic device and a readable storage medium.

Figure 7:
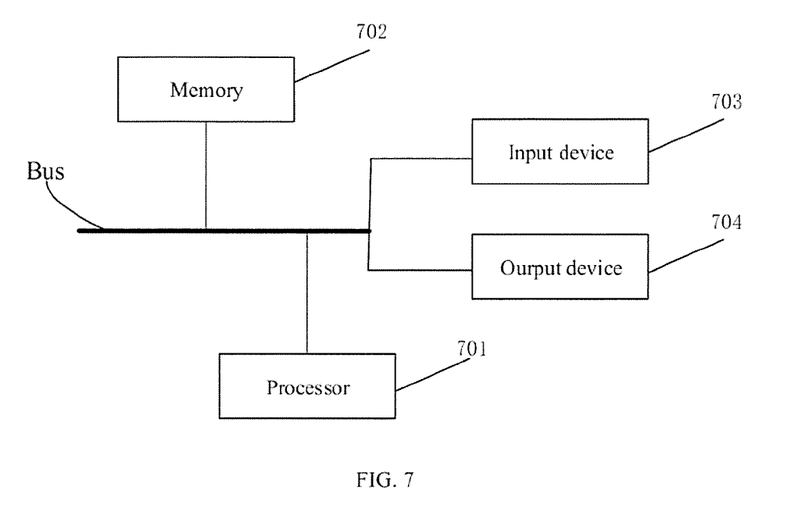
FIG. 7 is a block diagram of an electronic device used to implement the method for controlling cruise of the vehicle of embodiments of the present application.

As shown in FIG. 7, it is a block diagram of an electronic device for implementing the method for controlling cruise of a vehicle according to an embodiment of the present application. The electronic device are intended to represent various forms of digital computers, such as laptop computers, desktop computers, workbenches, personal digital assistants, servers, blade servers, mainframe computers, and other suitable computers. Electronic device may also represent various forms of mobile devices, such as personal digital assistants, cellular phones, intelligent phones, wearable devices, and other similar computing devices. The components shown herein, their connections and relations, and their functions are merely examples, and are not intended to limit the implementation of the present application described and/or required herein.

As shown in FIG. 7, the electronic device includes: one or more processors 701, a memory 702, and interlaces for connecting various components which include a high-speed interface and a low-speed interface. The various components are interconnected using different buses and can be mounted on a common motherboard or otherwise installed as required. The processor may process instructions executed within the electronic device, which include instructions stored in or on a memory to display graphic information of a graphical user interface (GUI) on an external input/output device (such as a display device coupled to the interface). In other embodiments, multiple processors and/or multiple buses can be used with multiple memories, if desired. Similarly, multiple electronic devices can be connected, each providing some of the necessary operations (for example, as a server array, a group of blade servers, or a multiprocessor system). One processor 701 is exemplified in FIG. 7.

The memory 702 is a non-transitory computer-readable storage medium provided by the present application, wherein the memory stores instructions executable by at least one processor, so as to enable the at least one processor to execute the method for controlling cruise of the vehicle provided by the present application. The non-transitory computer-readable storage medium of the present application stores computer instructions, which are used to cause a computer to execute the method for controlling cruise of the vehicle provided by the present application.

As a non-transitory computer-readable storage medium, the memory 702 can be used to store non-transitory software programs, non-transitory computer executable programs, and modules, such as program instructions/modules/units corresponding to the method for controlling cruise of the vehicle in the embodiments of the present application (for example, the first acquisition module 510, the second acquisition module 520, the trajectory interception module 530, the third acquisition module 540, the fourth acquisition module 550, and the controlling module 560 as shown in FIG. 5). The processor 701 executes various functional applications and data processing of the server by running non-transitory software programs, instructions, and modules stored in the memory 702, that is, implements the method for controlling cruise of the vehicle in the above described method embodiments.

The memory 702 may include a storage program area and a storage data area, wherein the storage program area can store an operating system and an application program required for at least one function; and the storage data area can store data created according to the use of the electronic device used for implementing the method for controlling cruise of the vehicle, etc. In addition, the memory 702 may include a high-speed random access memory, and may also include a non-transitory memory, such as at least one magnetic disk storage device, a flash memory device, or other non-transitory solid-state storage device. In some embodiments, the memory 702 may optionally include memories remotely provided relative to the processor 701, and these remote memories may be connected to the electronic device used for implementing the method for controlling cruise of the vehicle via a network. Examples of the above network include, but are not limited to, the Internet, an intranet, a local area network, a mobile communication network, and combinations thereof.

The electronic device used for implementing the method for controlling cruise of the vehicle may further include an input device 703 and an output device 704. The processor 701, the memory 702, the input device 703, and the output device 704 may be connected through a bus or in other manners. In FIG. 7, the connection through the bus is exemplified.

The input device 703 can receive inputted numeric or character information, and generate key signal inputs related to user settings and function control of the electronic device used for implementing the method for controlling cruise of the vehicle, such as a touch screen, a keypad, a mouse, a track pad, a touchpad, a pointing stick, one or more mouse buttons, a trackball, a joystick and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of systems and technologies described herein can be implemented in digital electronic circuit systems, integrated circuit systems, application specific integrated circuits (ASICs), computer hardwares, firmwares, softwares, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit data and instructions to the storage system, the at least one input device, and the at least one output device.

These computing programs (also referred to as programs, software, software applications, or codes) include machine instructions of a programmable processor and can be implemented using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (for example, magnetic disks, optical disks, memories, and programmable logic devices (PLDs)), including machine-readable medium that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a Cathode Ray Tube (CRT) or Liquid Crystal Display (LCD) monitor) for displaying information to the user; and a keyboard and pointing device (such as a mouse or trackball) through which the user can provide input into a computer. Other kinds of apparatuses may also be used to provide interaction with the user. For example, the feedback provided to the user may be any form of sensory feedback (for example, visual feedback, auditory feedback, or haptic feedback); and input from the user may be received in any form (including acoustic input, voice input, or tactile input).

The systems and technologies described herein can be implemented in a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including any combination of such background components, middleware components, and front-end components. The components of the system may be interconnected by any form or medium of digital data communication (such as, a communication network). Examples of communication networks include: a local area network (LAN), a wide area network (WAN), and the Internet.

The computer system may include clients and servers. The client and server are generally remote from each other and typically interact through a communication network. The client-server relation is generated by computer programs running on the respective computers and having a client-server relation with each other.

In the technical solutions according to embodiments of the present application, a pre-established three-dimensional trajectory map of the vehicle from a starting point to a destination can be acquired, and current positioning information of the vehicle can be acquired, and a target trajectory at a preset distance currently ahead of the vehicle can be intercepted from the three-dimensional trajectory map according to the current positioning information, and thereafter a target point can be acquired from the target trajectory according to the current positioning information, and the angle, at which front wheels of the vehicle are required to rotate, can be calculated according to the target point, the current positioning information, the wheelbase, and the current speed, and then movement of the vehicle can be controlled according to the angle required to rotate, so that the vehicle can automatically travel from the starting point to the destination. Thereby, in the controlling of the forward cruise of the vehicle, since the trajectory map used is a pre-established three-dimensional trajectory map, the method for controlling cruise of the present application is enabled to be applied to any road scene (such as a scene with complex roads or a scene of simple straight-travelling). As long as the three-dimensional trajectory map of the vehicle when driving on the road is pre-established, then in automatic driving, based on the pre-established three-dimensional trajectory map and the positioning information of the vehicle, the controlling of the forward cruise of the vehicle can be realized, so that the vehicle can automatically drive from the starting point to the destination, which can be applied to valet parking application scenarios.

It should be understood that the various forms of flows shown above can be used to reorder, add, or delete steps. For example, the steps disclosed in the present application can be executed in parallel, sequentially, or in different orders.

As long as the desired results of the technical solutions disclosed in the present application can be achieved, there is no limitation herein.

The foregoing specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of the present application shall be included in the protection scope of the present application.

What is claimed is:

1. A method for controlling cruise of a vehicle, comprising:
   acquiring a pre-established three-dimensional trajectory map of the vehicle from a starting point to a destination;
   acquiring current positioning information of the vehicle;
   intercepting a target trajectory at a preset distance currently ahead of the vehicle from the three-dimensional trajectory map according to the current positioning information, comprising: acquiring a point closest to the vehicle on the target trajectory according to the current positioning information;
   acquiring a target point from the target trajectory according to the current positioning information, comprising: acquiring the target point based on the point closest to the vehicle;
   acquiring a wheelbase and a current speed of the vehicle, and calculating an angle that front wheels of the vehicle are required to rotate, according to the target point, the current positioning information, the wheelbase, and the current speed;
   controlling a movement of the vehicle according to the angle.

2. The method according to claim 1, wherein the three-dimensional trajectory map is constructed according to images of a road ahead of the vehicle in a demonstration phase of a user driving the vehicle to travel from the starting point to the destination, that are respectively collected based on a plurality of shooting angles of a camera on the vehicle in the process of the demonstration phase.

3. The method according to claim 2, wherein the constructing the three-dimensional trajectory map according to the images comprises:
   acquiring, from the images, images of the same scene collected based on the multiple shooting angles;
   superimposing the images of the same scene to acquire a three-dimensional image for the same scene; and
   performing splicing processing on three-dimensional images of different scenes between the starting point and the destination to generate the three-dimensional trajectory map from the starting point to the destination for the vehicle.

4. The method according to claim 1, wherein the acquiring the current positioning information of the vehicle comprises:
   collecting images of the road currently ahead of the vehicle respectively based on the plurality of shooting angles of the camera;
   superimposing the collected images of the road currently ahead of the vehicle to acquire the three-dimensional image for the road currently ahead of the vehicle;
   extracting environmental features of the three-dimensional image of the road currently ahead of the vehicle;
   matching the environmental features of the three-dimensional image of the road currently ahead of the vehicle with the environmental features in the three-dimensional trajectory map; and
   determining the current positioning information of the vehicle from the three-dimensional trajectory map based on the matched environmental features.

5. The method according to claim 4, further comprising:
   acquiring, in the positioning process, when the camera is in a non-collection period, mileage that the vehicle has driven in the current non-collection period of the camera;
   acquiring real-time positioning information of the vehicle according to the mileage that the vehicle has driven in the current non-collection period of the camera, and the positioning information obtained based on the images of the road ahead of the vehicle collected in the previous collection period.

6. An apparatus for controlling cruise of a vehicle, comprising:
   one or more processors;
   a memory storing instructions executable by the one or more processors;
   wherein the one or more processors are configured to:
   acquire a pre-established three-dimensional trajectory map of the vehicle from a starting point to a destination;
   acquire current positioning information of the vehicle;
   intercept a target trajectory at a preset distance currently ahead of the vehicle from the three-dimensional trajectory map according to the current positioning information by acquiring a point closest to the vehicle on the target trajectory according to the current positioning information;
   acquire a target point from the target trajectory according to the current positioning information by acquiring the target point based on the point closest to the vehicle;
   acquire a wheelbase and a current speed of the vehicle;
   calculate an angle that front wheels of the vehicle are required to rotate, according to the target point, the current positioning information, the wheelbase, and the current speed, and to control a movement of the vehicle according to the angle.

7. The apparatus according to claim 6, wherein the three-dimensional trajectory map is constructed according to images of a road ahead of the vehicle in a demonstration phase of a user driving the vehicle to travel from the starting point to the destination, that are respectively collected based on a plurality of shooting angles of a camera on the vehicle in the process of the demonstration phase.

8. The apparatus according to claim 7, wherein the three-dimensional trajectory map is constructed according to the images by performing:
   acquiring, from the images, images of the same scene collected based on the multiple shooting angles;
   superimposing the images of the same scene to acquire a three-dimensional image for the same scene; and
   performing splicing processing on three-dimensional images of different scenes between the starting point and the destination to generate the three-dimensional trajectory map from the starting point to the destination for the vehicle.

9. The apparatus according to claim 6, wherein the one or more processors are configured to:
   collect images of the road currently ahead of the vehicle respectively based on the plurality of shooting angles of the camera;

superimpose the collected images of the road currently ahead of the vehicle to acquire the three-dimensional image for the road currently ahead of the vehicle;

extract environmental features of the three-dimensional image of the road currently ahead of the vehicle;

match the environmental features of the three-dimensional image of the road currently ahead of the vehicle with the environmental features in the three-dimensional trajectory map; and determine the current positioning information of the vehicle from the three-dimensional trajectory map based on the matched environmental features.

10. The apparatus according to claim 9, wherein the one or more processors are configured to:

acquire, in the positioning process, when the camera is in a non-collection period, mileage that the vehicle has driven in the current non-collection period of the camera; and acquire real-time positioning information of the vehicle according to the mileage that the vehicle has driven in the current non-collection period of the camera, and the positioning information obtained based on the images of the road ahead of the vehicle collected in the previous collection period.

11. A non-transitory computer-readable storage medium having instructions stored thereon, wherein the instructions are implemented to execute a method for controlling cruise of a vehicle, and the method comprises:

acquiring a pre-established three-dimensional trajectory map of the vehicle from a starting point to a destination;

acquiring current positioning information of the vehicle;

intercepting a target trajectory at a preset distance currently ahead of the vehicle from the three-dimensional trajectory map according to the current positioning information, comprising: acquiring a point closest to the vehicle on the target trajectory according to the current positioning information;

acquiring a target point from the target trajectory according to the current positioning information, comprising: acquiring the target point based on the point closest to the vehicle;

acquiring a wheelbase and a current speed of the vehicle, and calculating an angle that front wheels of the vehicle are required to rotate, according to the target point, the current positioning information, the wheelbase, and the current speed;

controlling a movement of the vehicle according to the angle.

* * * * *